US012154417B2

(12) United States Patent
Patel et al.

(10) Patent No.: US 12,154,417 B2
(45) Date of Patent: Nov. 26, 2024

(54) SYSTEM, METHOD, AND COMPUTER PROGRAM FOR SMART ATM TRANSACTION PROCESSING GATEWAY

(71) Applicant: JPMorgan Chase Bank, N.A., New York, NY (US)

(72) Inventors: Ankitkumar Patel, Dublin, OH (US); Anatoliy Lelikov, Gahanna, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 213 days.

(21) Appl. No.: 17/981,936

(22) Filed: Nov. 7, 2022

(65) Prior Publication Data

US 2024/0153360 A1 May 9, 2024

(51) Int. Cl.
*G07F 19/00* (2006.01)

(52) U.S. Cl.
CPC .......... *G07F 19/211* (2013.01); *G07F 19/208* (2013.01)

(58) Field of Classification Search
CPC ............................ G07F 19/211; G07F 19/208
See application file for complete search history.

(56) References Cited

U.S. PATENT DOCUMENTS 7,167,924 B1 * 1/2007 Symonds ........... G06Q 20/1085 709/206
10,552,828 B2 * 2/2020 Hammad ............. G06Q 20/382
2008/0270246 A1 * 10/2008 Chen .................... G06Q 20/105 705/17
2012/0330769 A1 * 12/2012 Arceo ................ G06Q 20/4014 455/411
2013/0304796 A1 * 11/2013 Jackowski .............. H04L 65/80 709/202
2022/0141666 A1 * 5/2022 Armerding ........... H04W 12/06 726/12
2022/0335514 A1 * 10/2022 Tian ........................ H04L 41/22

* cited by examiner

*Primary Examiner* — Oleg Survillo
*Assistant Examiner* — Monishwar Mohan
(74) *Attorney, Agent, or Firm* — GREENBLUM & BERNSTEIN, P.L.C.

(57) ABSTRACT

Various methods, apparatuses/systems, and media for mediating traffic between an APCR and a TPS. A processor intercepts all traffic between a plurality of APCR and a plurality of TPS; halts a TCP connection from an incoming transaction request; determines that the incoming transaction request has been originated from a particular APCR among the plurality of APCR; checks, based on determining, which TPS or its siblings the incoming transaction request should be routed to; executes, based on checking, a new TCP connection with either the TPS or its siblings; receives, based on the new TCP connection, a response from the connected TPS or its siblings; attaches the response to the halted TCP connection after intercepting the response; resumes the halted TCP connection; and receives the response by an APCR node of the particular APCR in a manner as if directly received from the TPS or its siblings.

20 Claims, 6 Drawing Sheets

100

SYSTEM, METHOD, AND COMPUTER PROGRAM FOR SMART ATM TRANSACTION PROCESSING GATEWAY

TECHNICAL FIELD

This disclosure generally relates to data processing, and, more particularly, to methods and apparatuses for implementing a platform, language, and cloud agnostic smart Automated Teller Machine (ATM) transaction processing gateway module configured to intelligently determine the routing of individual ATM transaction requests.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

An ATM fleet typically communicate to its middleware layer, which handles further communication to downstream systems, including communication to Transaction Processing System (TPS) for transaction authorization and processing. A conventional ATM platform runs on a dedicated hardware which provides a static environment that TPS can easily recognize and use its static nomenclature for authentication purposes before allowing for authorization and processing of a transactions from an ATM. In the current era of cloud computing, running dedicated hardware may become counterproductive due to the higher cost and higher operational and maintenance impact. To overcome this short coming, there is a need to redesign the system according to modern standards and best practices. One of the major roadblocks to achieve this milestone may be due to its existing tight coupling between physical host of ATM Platform Cloud Region (APCR) and TPS. More specifically, there may be multiple TPS systems and multiple APCR nodes. Each TPS knows one or more of these nodes. Such direct relationship is the basis for authentication of originating APCR at TPS layer. For example, if a TPS receives a request from an unknown APCR, then it would not process it.

Conventional tools that provide tight coupling between APCR and TPS may quickly become a problem in a cloud environment where there may be no dedication of static hosts for running APCR instances. While TPS is still processing all incoming requests from APCR, it may no longer determine which specific Processing Center (PC) should be used for each individual requests. This happens because TPS may no longer see source address from where a request is originated.

Thus, there is a need for an advanced tool that can break the tight coupling between APCR and TPS, while maintaining full resiliency and having an ability at points of the flow.

SUMMARY

The present disclosure, through one or more of its various aspects, embodiments, and/or specific features or sub-components, provides, among other features, various systems, servers, devices, methods, media, programs, and platforms for implementing a platform, language, and cloud agnostic smart ATM transaction processing gateway module configured to mediate the traffic between an APCR and a TPS, break the tight coupling between APCR and TPS, while maintaining full resiliency and having an ability at points of the flow, and intelligently determine the routing of individual ATM transaction requests, but the disclosure is not limited thereto.

For example, unlike typical reverse proxy that operates at layer 7 (Application Layer—HTTP) of OSI model, smart ATM transaction processing gateway module, according to an aspect of the present disclosure, operates at layer 4 (Transport Layer—transmission control protocol (TCP)) of OSI Model and employs additional routing logic to intelligently determine the routing of individual requests. The smart ATM transaction processing gateway module, according to a further aspect of the present disclosure, may be configured to provide full cross region high availability across all 3 layers: APCR, SATPG, and TPS while keeping overall end-to-end flow fully operational and transparent to ATM transactions. According to an additional aspect of the present disclosure, the smart ATM transaction processing gateway module may be configured to solve the problem of authentication in an environment where TPS relies on a static address of the client to determine which PC to be used for processing an individual client transaction, but the disclosure is not limited thereto.

According to an aspect of the present disclosure, a method for implementing an SATPG configured to mediate traffic between an APCR and a TPS by utilizing one or more processors along with allocated memory is disclosed. The method may include: intercepting all traffic between a plurality of APCR and a plurality of TPS; halting a TCP connection from an incoming transaction request; determining that the incoming transaction request has been originated from a particular APCR among the plurality of APCR; checking, based on determining, which TPS or sibling SATPG the incoming transaction request should be routed to; executing, based on checking, a new TCP connection with either the TPS or the sibling SATPG; receiving, based on the new TCP connection, a response from the connected TPS or the sibling SATPG; attaching the response to the halted TCP connection after intercepting the response; resuming the halted TCP connection; and receiving the response by an APCR node of the particular APCR in a manner as if directly received from the TPS or the sibling SATPG.

According to a further aspect of the present disclosure, the APCR may comprise a group of multiple ephemeral ATM platform servers in each region, and the TPS may comprise a group of servers which processes an ATM transaction, but the disclosure is not limited thereto.

According to another aspect of the present disclosure, each TPS may include a plurality of PCs embedded therein, and wherein each PC may be configured to process a corresponding type of ATM transaction, but the disclosure is not limited thereto.

According to yet another aspect of the present disclosure, the method may further include implementing the SATPG in a manner such that it may comprise a group of servers responsible for mediating the traffic between the APCR and the TPS.

According to an aspect of the present disclosure, the sibling SATPG may correspond to related SATPG servers in each region.

According to a further aspect of the present disclosure, when it is determined that the incoming transaction request should be routed directly to the TPS, the method may further include: receiving the incoming transaction request; and executing the TPS's rule engine to select a corresponding PC embedded within the TPS based on the SATPG sever, wherein the corresponding PC is configured to process the incoming transaction request.

According to another aspect of the present disclosure, when it is determined that the incoming transaction request should be routed to a corresponding sibling SATPG, the method may further include: re-routing the incoming transaction request to the corresponding sibling SATPG; and repeating, by the corresponding sibling SATPG, the steps of halting, determining, checking, and executing; receiving the incoming transaction request; determining that the incoming transaction request should be routed directly to another TPS; and executing said another TPS's rule engine to select a corresponding PC embedded within said another TPS based on the sibling SATPG sever, wherein the corresponding PC is configured to process the incoming transaction request.

According to yet another aspect of the present disclosure, when the APCR loses a node, the method may further include: recognizing by the SATPG that the APCR node is down; determining, by the SATPG, whether any other APCR node is available as part of same group; automatically reconnecting to said other available APCR node; and routing, in response to automatically reconnecting, the incoming transaction request to the TPS.

According to an additional aspect of the present disclosure, when the SATPG loses a node, nodes in the APCR gets automatically reconnected to any other available SATPG nodes.

According to a further aspect of the present disclosure, the method may further include: implementing a preconfigured logic algorithm to establish a tight coupling between the SATPG and the TPS, and wherein, when the TPS loses a PC embedded within the TPS, SATPG nodes gets automatically routed to other available PC by the TPS because of the tight coupling between the SATPG and the TPS.

According to an aspect of the present disclosure, a system for implementing an SATPG configured to mediate traffic between an APCR and a TPS is disclosed. The system may include a processor; and a memory operatively connected to the processor via a communication interface, the memory storing computer readable instructions, when executed, may cause the processor to: intercept all traffic between a plurality of APCR and a plurality of TPS; halt a TCP connection from an incoming transaction request; determine that the incoming transaction request has been originated from a particular APCR among the plurality of APCR; check, based on determining, which TPS or sibling SATPG the incoming transaction request should be routed to; execute, based on checking, a new TCP connection with either the TPS or the sibling SATPG; receive, based on the new TCP connection, a response from the connected TPS or the sibling SATPG; attach the response to the halted TCP connection after intercepting the response; resume the halted TCP connection; and receive the response by an APCR node of the particular APCR in a manner as if directly received from the TPS or the sibling SATPG.

According to a further aspect of the present disclosure, the processor may be further configured to implement the SATPG in a manner such that it comprises a group of servers responsible for mediating the traffic between the APCR and the TPS.

According to an aspect of the present disclosure, when it is determined that the incoming transaction request should be routed directly to the TPS, the processor may be further configured to: receive the incoming transaction request; and execute the TPS's rule engine to select a corresponding PC embedded within the TPS based on the SATPG sever, wherein the corresponding PC is configured to process the incoming transaction request.

According to a further aspect of the present disclosure, when it is determined that the incoming transaction request should be routed to a corresponding sibling SATPG, the processor may be further configured to: re-route the incoming transaction request to the corresponding sibling SATPG; and cause the corresponding sibling SATPG to repeat the functions of halting, determining, checking, and executing; receive the incoming transaction request; determine that the incoming transaction request should be routed directly to another TPS; and execute said another TPS's rule engine to select a corresponding PC embedded within said another TPS based on the sibling SATPG sever, wherein the corresponding PC is configured to process the incoming transaction request.

According to another aspect of the present disclosure, when the APCR loses a node, the processor may be further configured to: recognize by the SATPG that the APCR node is down; determine, by the SATPG, whether any other APCR node are available as part of same group; automatically reconnect to said other available APCR node; and route, in response to automatically reconnecting, the incoming transaction request to the TPS.

According to an aspect of the present disclosure, when the SATPG loses a node, the processor may cause nodes in the APCR to be automatically reconnected to any other available SATPG nodes.

According to an additional aspect of the present disclosure, the processor may be further configured to: implement a preconfigured logic algorithm to establish a tight coupling between the SATPG and the TPS, and wherein, when the TPS loses a PC embedded within the TPS, SATPG nodes gets automatically routed to other available PC by the TPS because of the tight coupling between the SATPG and the TPS.

According to a further aspect of the present disclosure, a non-transitory computer readable medium configured to store instructions for implementing an SATPG configured to mediate traffic between an APCR and a TPS is disclosed. The instructions, when executed, may cause a processor to perform the following: intercepting all traffic between a plurality of APCR and a plurality of TPS; halting a TCP connection from an incoming transaction request; determining that the incoming transaction request has been originated from a particular APCR among the plurality of APCR; checking, based on determining, which TPS or sibling SATPG the incoming transaction request should be routed to; executing, based on checking, a new TCP connection with either the TPS or the sibling SATPG; receiving, based on the new TCP connection, a response from the connected TPS or the sibling SATPG; attaching the response to the halted TCP connection after intercepting the response; resuming the halted TCP connection; and receiving the response by an APCR node of the particular APCR in a manner as if directly received from the TPS or the sibling SATPG.

According to yet another aspect of the present disclosure, the instructions, when executed, may further cause the processor to perform the following: implementing the SATPG in a manner such that it may comprise a group of servers responsible for mediating the traffic between the APCR and the TPS.

According to a further aspect of the present disclosure, when it is determined that the incoming transaction request should be routed directly to the TPS, the instructions, when executed, may further cause the processor to perform the following: receiving the incoming transaction request; and executing the TPS's rule engine to select a corresponding PC embedded within the TPS based on the SATPG sever, wherein the corresponding PC is configured to process the incoming transaction request.

According to another aspect of the present disclosure, when it is determined that the incoming transaction request should be routed to a corresponding sibling SATPG, the instructions, when executed, may further cause the processor to perform the following: re-routing the incoming transaction request to the corresponding sibling SATPG; and repeating, by the corresponding sibling SATPG, the steps of halting, determining, checking, and executing; receiving the incoming transaction request; determining that the incoming transaction request should be routed directly to another TPS; and executing said another TPS's rule engine to select a corresponding PC embedded within said another TPS based on the sibling SATPG sever, wherein the corresponding PC is configured to process the incoming transaction request.

According to yet another aspect of the present disclosure, when the APCR loses a node, the instructions, when executed, may further cause the processor to perform the following: recognizing by the SATPG that the APCR node is down; determining, by the SATPG, whether any other APCR node is available as part of same group; automatically reconnecting to said other available APCR node; and routing, in response to automatically reconnecting, the incoming transaction request to the TPS.

According to an additional aspect of the present disclosure, when the SATPG loses a node, the instructions, when executed, may further cause the processor to perform the following: causing nodes in the APCR to be automatically reconnected to any other available SATPG nodes.

According to a further aspect of the present disclosure, the instructions, when executed, may further cause the processor to perform the following: implementing a preconfigured logic algorithm to establish a tight coupling between the SATPG and the TPS, and wherein, when the TPS loses a PC embedded within the TPS, SATPG nodes gets automatically routed to other available PC by the TPS because of the tight coupling between the SATPG and the TPS.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
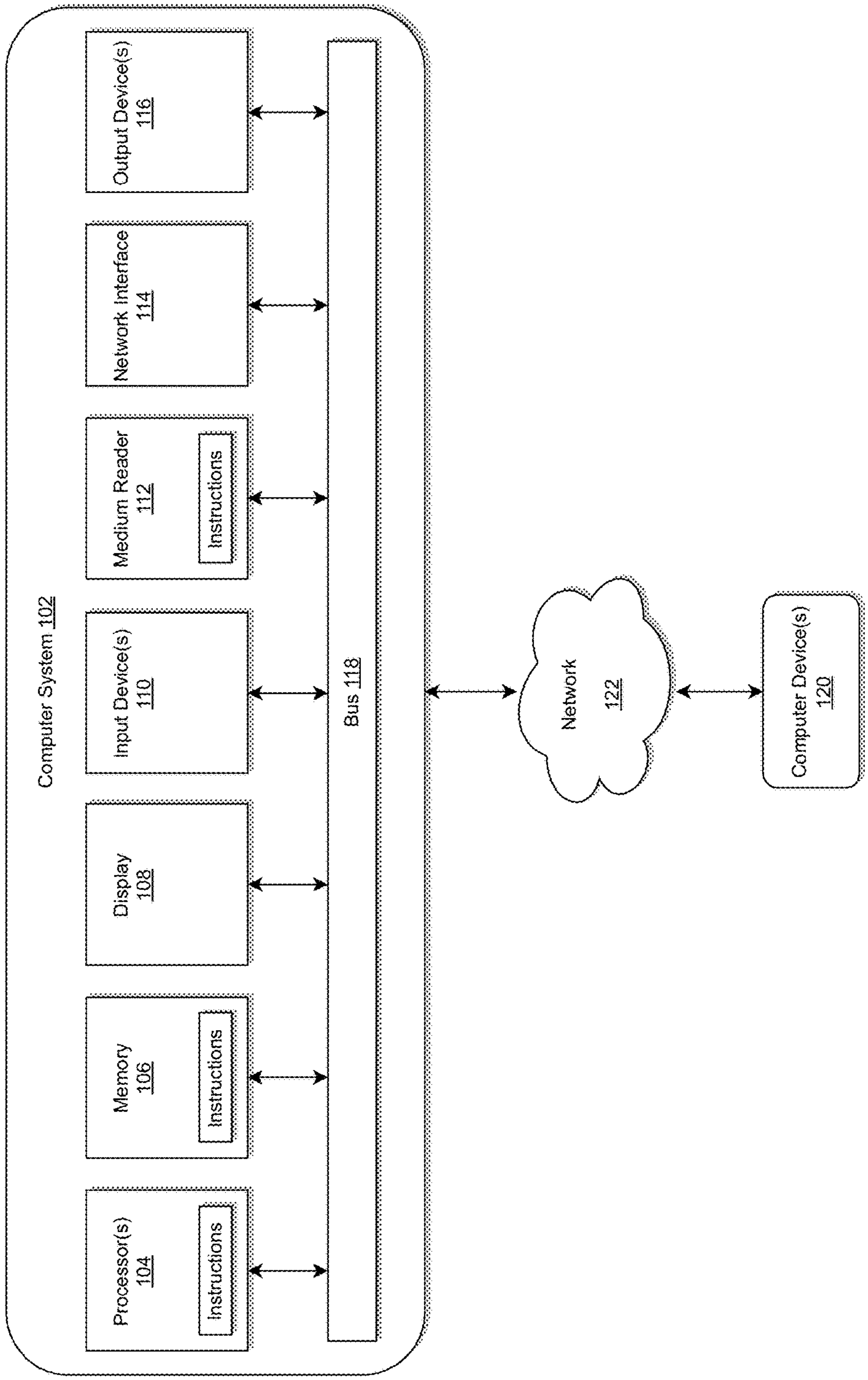
FIG. 1 illustrates a computer system for implementing a platform, language, and cloud agnostic smart ATM transaction processing gateway module for implementing an SATPG configured to mediate traffic between an APCR and a TPS in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, and cloud agnostic smart ATM transaction processing gateway module for implementing an SATPG configured to mediate traffic between an APCR and a TPS in accordance with an exemplary embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the smart ATM transaction processing gateway module may be platform, language, and cloud agnostic that may allow for consistent easy orchestration and passing of data through various components to output a desired result regardless of platform, language, and cloud environment. Since the disclosed process, according to exemplary embodiments, is platform, language, and cloud agnostic, the smart ATM transaction processing gateway module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
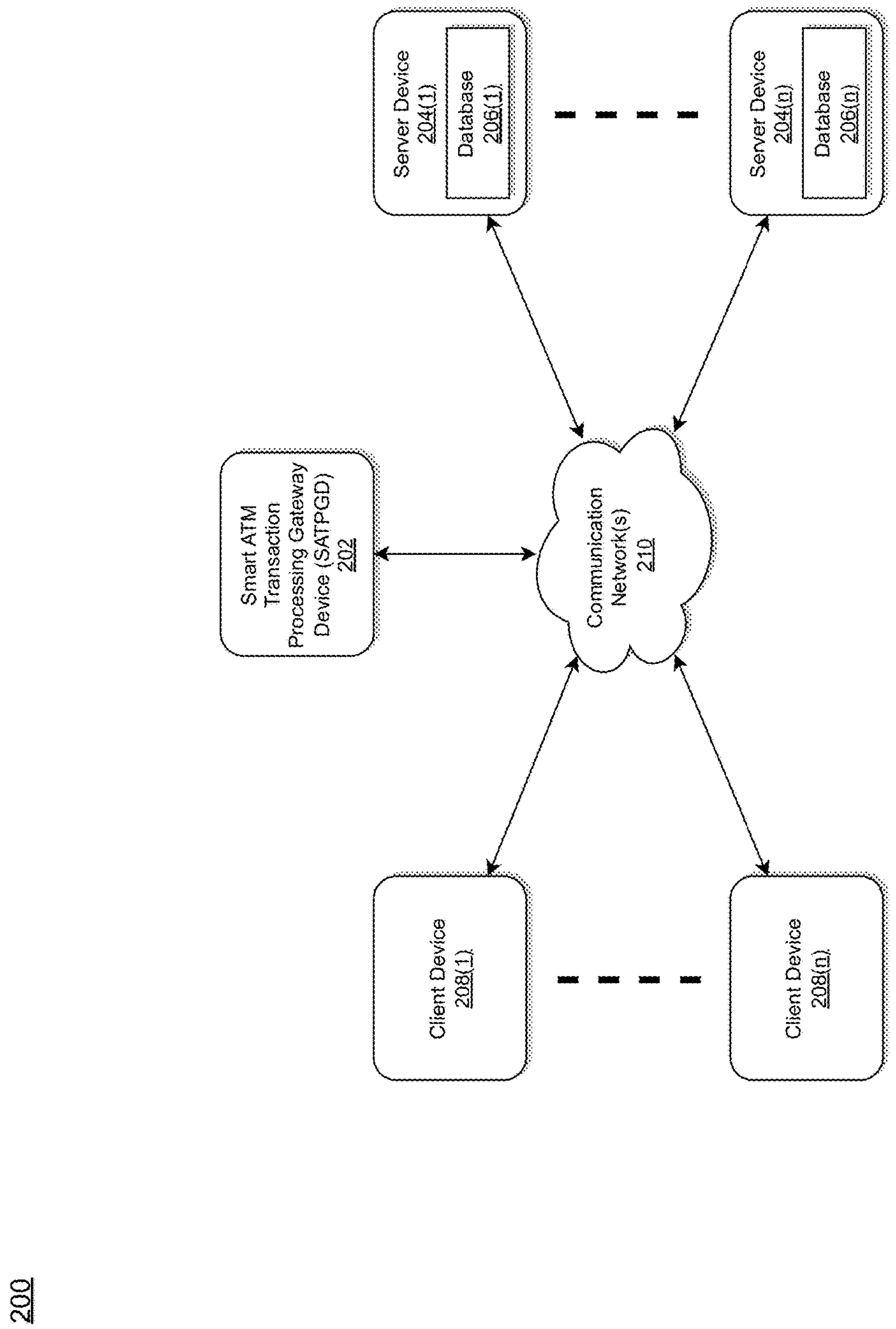
FIG. 2 illustrates an exemplary diagram of a network environment with a platform, language, and cloud agnostic smart ATM transaction processing gateway device in accordance with an exemplary embodiment.

Referring to FIG. 2, a schematic of an exemplary network environment 200 for implementing a language, platform, and cloud agnostic smart ATM transaction processing gateway device (SATPGD) of the instant disclosure is illustrated.

According to exemplary embodiments, the above-described problems associated with conventional tools may be overcome by implementing an SATPGD 202 as illustrated in FIG. 2 that may be configured for implementing a platform, language, and cloud agnostic smart ATM transaction processing gateway module for implementing a platform and language agnostic smart ATM transaction processing gateway configured to mediate the traffic between an APCR and a TPS, break the tight coupling between APCR and TPS, while maintaining full resiliency and having an ability at points of the flow, and intelligently determine the routing of individual ATM transaction requests, but the disclosure is not limited thereto.

The SATPGD 202 may be the same or similar to the computer system 102 as described with respect to FIG. 1.

The SATPGD 202 may store one or more applications that can include executable instructions that, when executed by the SATPGD 202, cause the SATPGD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SATPGD 202 itself, may be located in virtual server(s) running in a cloud-based computing environment rather than being tied to one or more specific physical network computing devices. Also, the application(s) may be running in one or more virtual machines (VMs) executing on the SATPGD 202. Additionally, in one or more embodiments of this technology, virtual machine(s) running on the SATPGD 202 may be managed or supervised by a hypervisor.

In the network environment 200 of FIG. 2, the SATPGD 202 is coupled to a plurality of server devices 204(1)-**204(*n*) that hosts a plurality of databases 206(1)-206(*n*), and also to a plurality of client devices 208(1)-208(*n*) via communication network(s) 210. A communication interface of the SATPGD 202, such as the network interface 114 of the computer system 102 of FIG. 1, operatively couples and communicates between the SATPGD 202, the server devices 204(1)-204(*n*), and/or the client devices 208(1)-208(*n*), which are all coupled together by the communication network(s) 210**, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SATPGD 202, the server devices 204(1)-**204(*n*), and/or the client devices 208(1)-208(*n*) may be coupled together via other topologies. Additionally, the network environment 200** may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SATPGD 202 may be a standalone device or integrated with one or more other devices or apparatuses, such as one or more of the server devices 204(1)-204(*n*), for example. In one particular example, the SATPGD 202 may be hosted by one of the server devices 204(1)-204(*n*), and other arrangements are also possible. Moreover, one or more of the devices of the SATPGD 202 may be in the same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204(*n*) may include, among other features, one or more processors, a memory, and a communication interface, which are coupled together by a bus or other communication link, although other numbers and/or types of network devices may be used. The server devices 204(1)-204(*n*) in this example may process requests received from the SATPGD 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206(*n*) that are configured to store metadata sets, data quality rules, and newly generated data.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*).

According to exemplary embodiments, the client devices 208(1)-208(*n*) in this example may include any type of computing device that can facilitate the implementation of the SATPGD 202 that may efficiently provide a platform for implementing a platform, language, and cloud agnostic smart ATM transaction processing gateway module for implementing a platform and language agnostic smart ATM transaction processing gateway configured to mediate the traffic between an APCR and a TPS, break the tight coupling between APCR and TPS, while maintaining full resiliency and having an ability at points of the flow, and intelligently determine the routing of individual ATM transaction requests, but the disclosure is not limited thereto.

The client devices 208(1)-208(*n*) may run interface applications, such as standard web browsers or standalone client applications, which may provide an interface to communicate with the SATPGD 202 via the communication network(s) 210 in order to communicate user requests. The client devices 208(1)-208(*n*) may further include, among other features, a display device, such as a display screen or touchscreen, and/or an input device, such as a keyboard, for example.

Although the exemplary network environment 200 with the SATPGD 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the SATPGD 202, the server devices 204(1)-204(*n*), or the client devices 208(1)-208(*n*), for example, may be configured to operate as virtual instances on the same physical machine. For example, one or more of the SATPGD 202, the server devices 204(1)-204(*n*), or the client devices 208(1)-208(*n*) may operate on the same physical device rather than as separate devices communicating through communication network(s) 210. Additionally, there may be more or fewer SATPGDs 202, server devices 204(1)-204(*n*), or client devices 208(1)-208(*n*) than illustrated in FIG. 2. According to exemplary embodiments, the SATPGD 202 may be configured to send code at run-time to remote server devices 204(1)-204(*n*), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
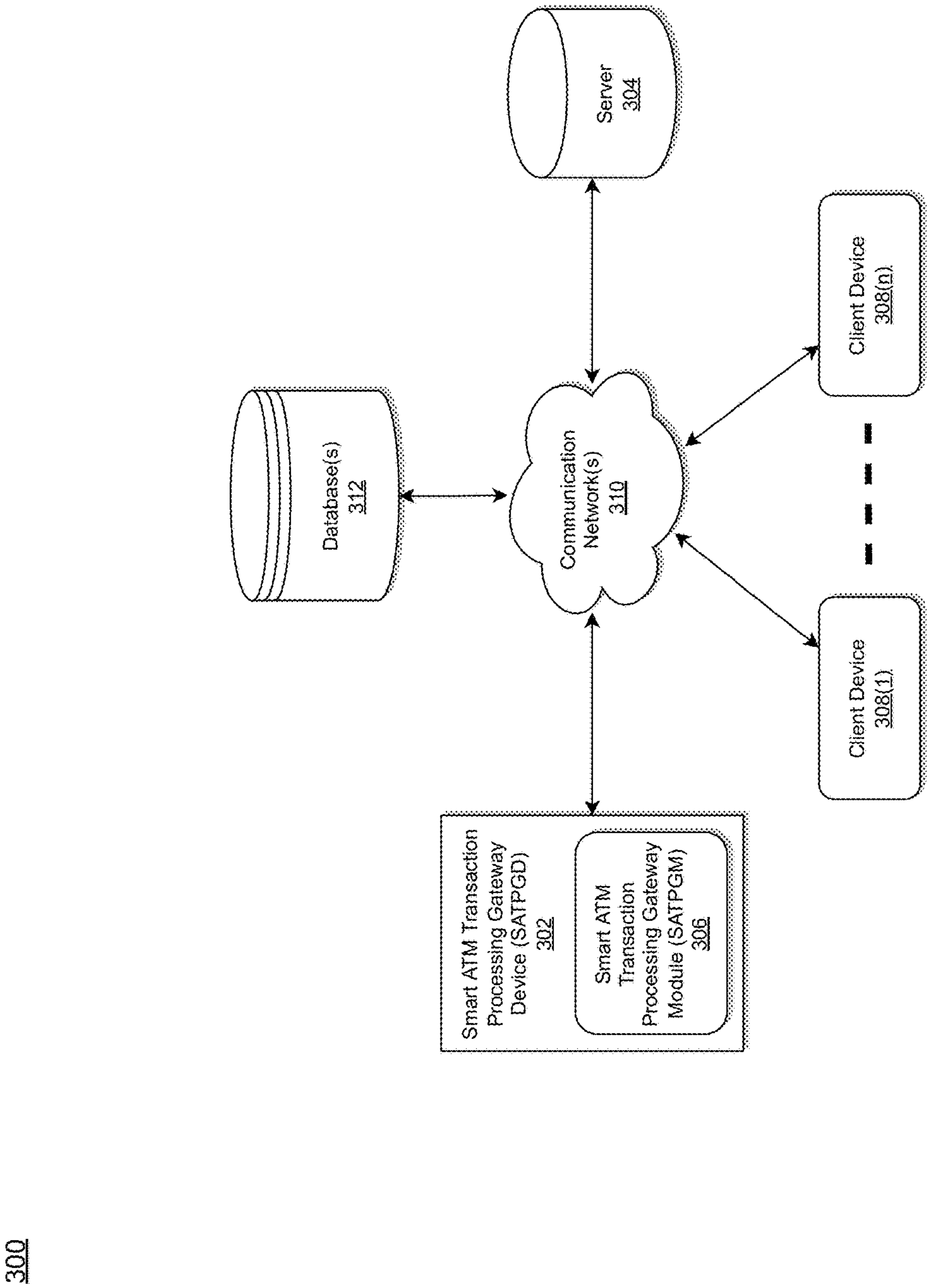
FIG. 3 illustrates a system diagram for implementing a platform, language, and cloud agnostic smart ATM transaction processing gateway device having a platform, language, and cloud agnostic smart ATM transaction processing gateway module in accordance with an exemplary embodiment.

FIG. 3 illustrates a system diagram for implementing a platform, language, and cloud agnostic SATPGD having a platform, language, and cloud agnostic smart ATM transaction processing gateway module (SATPGM) in accordance with an exemplary embodiment.

As illustrated in FIG. 3, the system 300 may include a SATPGD 302 within which an SATPGM 306 is embedded, a server 304, a database(s) 312, a plurality of client devices 308(1) . . . 308(*n*), and a communication network 310.

According to exemplary embodiments, the SATPGD 302 including the SATPGM 306 may be connected to the server 304, and the database(s) 312 via the communication network 310. The SATPGD 302 may also be connected to the plurality of client devices 308(1) . . . 308(*n*) via the communication network 310, but the disclosure is not limited thereto.

According to exemplary embodiment, the SATPGD 302 is described and shown in FIG. 3 as including the SATPGM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the SATPGM 306 may be configured to receive real-time feed of data from the plurality of client devices 308(1) . . . 308(*n*) and secondary sources via the communication network 310.

As may be described below, the SATPGM 306 may be configured to: intercept all traffic between a plurality of APCR and a plurality of TPS; halt a TCP connection from an incoming transaction request; determine that the incoming transaction request has been originated from a particular APCR among the plurality of APCR; check, based on determining, which TPS or sibling SATPG the incoming transaction request should be routed to; execute, based on checking, a new TCP connection with either the TPS or the sibling SATPG; receive, based on the new TCP connection, a response from the connected TPS or the sibling SATPG; attach the response to the halted TCP connection after intercepting the response; resume the halted TCP connection; and receive the response by an APCR node of the particular APCR in a manner as if directly received from the TPS or the sibling SATPG, but the disclosure is not limited thereto.

The plurality of client devices 308(1) . . . 308(*n*) are illustrated as being in communication with the SATPGD 302. In this regard, the plurality of client devices 308(1) . . . 308(*n*) may be "clients" (e.g., customers) of the SATPGD 302 and are described herein as such. Nevertheless, it is to be known and understood that the plurality of client devices 308(1) . . . 308(*n*) need not necessarily be "clients" of the SATPGD 302, or any entity described in association therewith herein. Any additional or alternative relationship may exist between either or both of the plurality of client devices 308(1) . . . 308(*n*) and the SATPGD 302, or no relationship may exist.

The first client device 308(1) may be, for example, a smart phone. Of course, the first client device 308(1) may be any additional device described herein. The second client device 308(*n*) may be, for example, a personal computer (PC). Of course, the second client device 308(*n*) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(*n*) may communicate with the SATPGD 302 via broadband or cellular communication. Of course, these embodiments are merely exemplary and are not limiting or exhaustive.

The computing device 301 may be the same or similar to any one of the client devices 208(1)-208(*n*) as described with respect to FIG. 2, including any features or combination of features described with respect thereto. The SATPGD 302 may be the same or similar to the SATPGD 202 as described with respect to FIG. 2, including any features or combination of features described with respect thereto.

Figure 4:
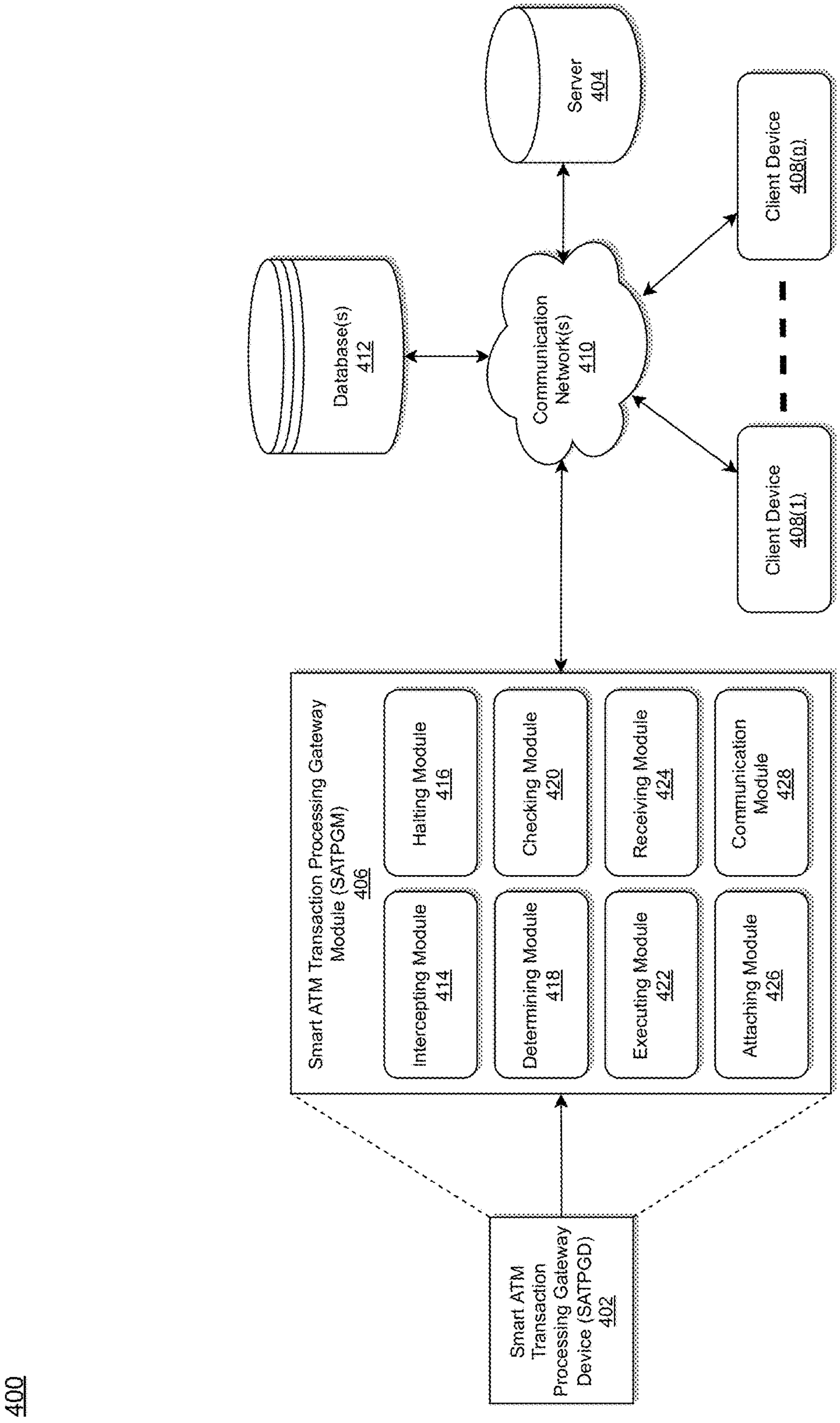
FIG. 4 illustrates a system diagram for implementing a platform, language, and cloud agnostic smart ATM transaction processing gateway module of FIG. 3 in accordance with an exemplary embodiment.

FIG. 4 illustrates a system diagram for implementing a platform, language, and cloud agnostic SATPGM of FIG. 3 in accordance with an exemplary embodiment.

According to exemplary embodiments, the system 400 may include a platform, language, and cloud agnostic SATPGD 402 within which a platform, language, and cloud agnostic SATPGM 406 is embedded, a server 404, database(s) 412, and a communication network 410. According to exemplary embodiments, server 404 may comprise a plurality of servers located centrally or located in different locations, but the disclosure is not limited thereto.

According to exemplary embodiments, the SATPGD 402 including the SATPGM 406 may be connected to the server 404 and the database(s) 412 via the communication network 410. The SATPGD 402 may also be connected to the plurality of client devices 408(1)-408(*n*) via the communication network 410, but the disclosure is not limited thereto. The SATPGM 406, the server 404, the plurality of client devices 408(1)-408(*n*), the database(s) 412, the communication network 410 as illustrated in FIG. 4 may be the same or similar to the SATPGM 306, the server 304, the plurality of client devices 308(1)-308(*n*), the database(s) 312, the communication network 310, respectively, as illustrated in FIG. 3.

According to exemplary embodiments, as illustrated in FIG. 4, the SATPGM 406 may include an intercepting module 414, a halting module 416, a determining module 418, a checking module 420, an executing module 422, a receiving module 424, an attaching module 426, and a communication module 428. According to exemplary embodiments, interactions and data exchange among these modules included in the SATPGM 406 provide the advantageous effects of the disclosed invention. Functionalities of each module of FIG. 4 may be described in detail below with reference to FIGS. 4-6.

According to exemplary embodiments, each of the intercepting module 414, halting module 416, determining module 418, checking module 420, executing module 422, receiving module 424, attaching module 426, and the communication module 428 of the SATPGM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the intercepting module 414, halting module 416, determining module 418, checking module 420, executing module 422, receiving module 424, attaching module 426, and the communication module 428 of the SATPGM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the intercepting module 414, halting module 416, determining module 418, checking module 420, executing module 422, receiving module 424, attaching module 426, and the communication module 428 of the SATPGM 406 of FIG. 4 may be implemented by dedicated hardware, or as a combination of dedicated hardware to perform some functions and a processor (e.g., one or more programmed microprocessors and associated circuitry) to perform other functions.

According to exemplary embodiments, each of the intercepting module 414, halting module 416, determining module 418, checking module 420, executing module 422, receiving module 424, attaching module 426, and the communication module 428 of the SATPGM 406 of FIG. 4 may be called via corresponding API.

According to exemplary embodiments, the process implemented by the SATPGM 406 may be executed via the communication module 428 and the communication network 410, which may comprise plural networks as described above. For example, in an exemplary embodiment, the various components of the SATPGM 406 may communicate with the server 404, and the database(s) 412 via the communication module 428 and the communication network 410. Of course, these embodiments are merely exemplary and are not limiting or exhaustive. The database(s) 412 may include the databases included within the private cloud and/or public cloud and the server 404 may include one or more servers within the private cloud and the public cloud.

Figure 5:
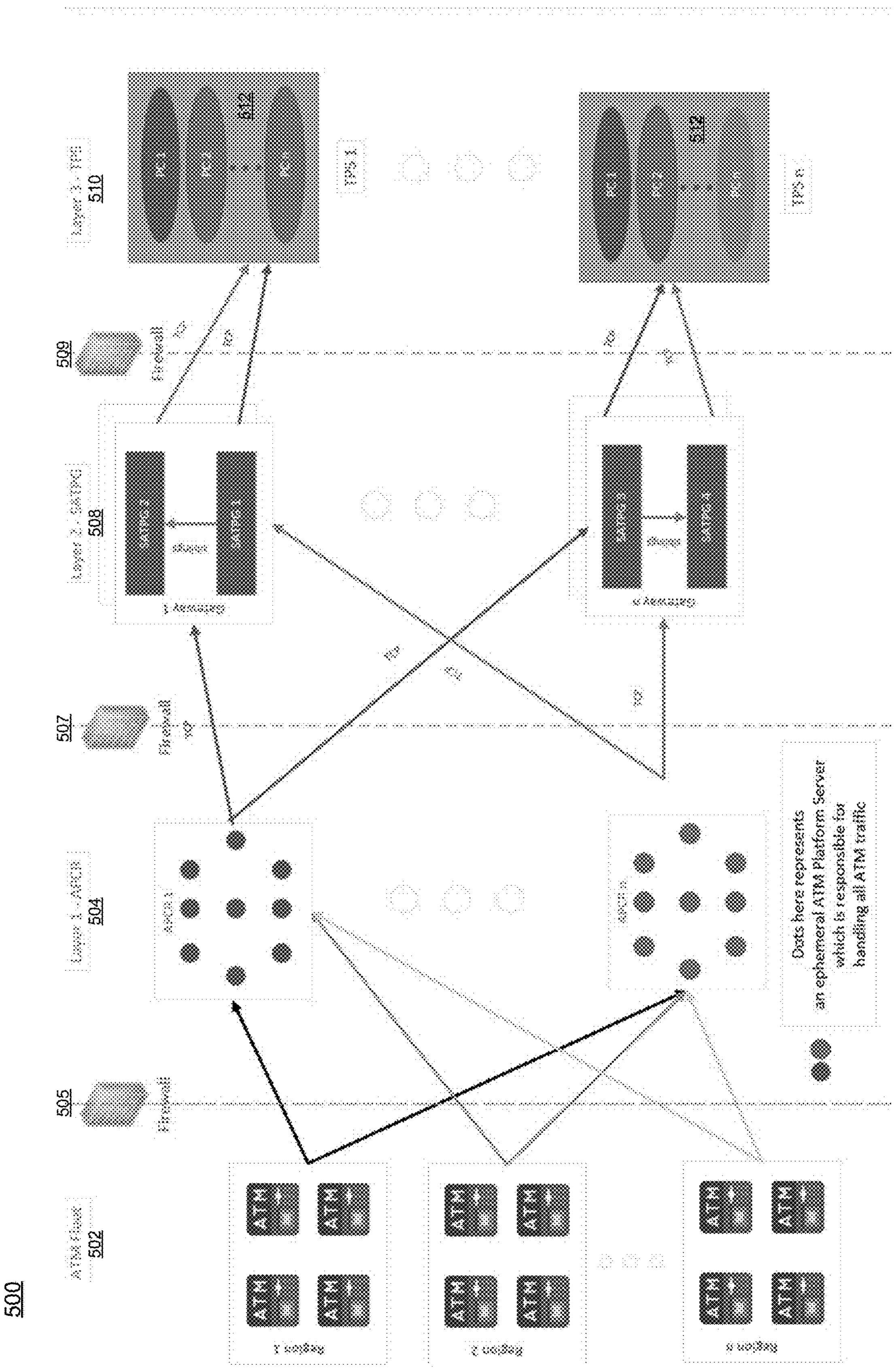
FIG. 5 illustrates an exemplary logic diagram implemented by the platform, language, and cloud agnostic smart ATM transaction processing gateway module of FIG. 4 in accordance with an exemplary embodiment.

FIG. 5 illustrates an exemplary logic diagram 500 implemented by the platform, language, and cloud agnostic SATPGM 406 of FIG. 4 in accordance with an exemplary embodiment. As illustrated in the exemplary logic diagram 500 of FIG. 5, a plurality of ATM fleet 502 may be located in a plurality of regions, i.e., region 1, region 2, . . . region n, etc. Each ATM among the ATM fleet 502 may communicate with one or more APCR 504 (i.e., APCR 1 . . . APCR n). According to exemplary embodiments, each ATM among the ATM fleet 502 may pass a first firewall 505 by a first preconfigured authentication process to communicate with layer 1 of the communication protocol where the APCR 504 are located. Each APCR 504 (i.e., APCR 1 . . . APCR n) may pass a second firewall 507 by a second preconfigured authentication process to communicate with layer 2 of the communication protocol where a plurality of SATPG 508 (i.e., Gateway 1, . . . Gateway n) are located. As illustrated in FIG. 5, the sibling SATPG corresponds to related SATPG servers in each region. For example, SATPG 2 may be a sibling of SATPG 1 because both SATPG 1 and SATPG 2 are located within gateway 1. Similarly, SATPG 4 may be sibling of SATPG 3 because both SATPG 3 and SATPG 4 are located in gateway n.

As illustrated in FIG. 5, communication between the plurality of SATPG 508 and layer 3 of the communication protocol where a plurality of TPS 510 are located are also protected by a third firewall 509. Thus, according to exemplary embodiments, each SATPG 508 may pass the third firewall 509 by a third preconfigured authentication process to communicate with layer 3 of the communication protocol where the plurality of TPS 510 (i.e., TPS 1, . . . TPS n) are located. Each TPS 510 may comprise of one or more PC 512 (i.e., PC 1, . . . PC n).

Referring back to FIGS. 4 and 5, according to exemplary embodiments, the intercepting module 414 may be configured to intercept all traffic between a plurality of APCR 504 and a plurality of TPS 510. The halting module 416 may be configured to halt a TCP connection from an incoming transaction request.

According to exemplary embodiments, the determining module 418 may be configured to determine that the incoming transaction request has been originated from a particular APCR (i.e., APCR 1 among the plurality of APCR 504). The checking module 420 may be configured to check, based on determining by the determining module 418, which TPS 510 or sibling SATPG 508 the incoming transaction request should be routed to.

According to exemplary embodiments, the executing module 422 may be configured to execute, based on checking by the checking module 420, a new TCP connection with either the TPS 510 or the sibling SATPG 508. The receiving module 424 may be configured to receive, based on the new TCP connection, a response from the connected TPS 510 or the sibling SATPG 508. The attaching module 426 may be configured to attach the response to the halted TCP connection after intercepting the response. The executing module 422 may be further configured to resume the halted TCP connection; and the receiving module 424 may be further configured to receive the response by an APCR node of the particular APCR (i.e., APCR 1 among the plurality of APCR 504) in a manner as if directly received from the TPS 510 or the sibling SATPG 508.

According to exemplary embodiments, the executing module 422 may be further configured to implement the SATPG 508 in a manner such that it comprises a group of servers responsible for mediating the traffic between the APCR 504 and the TPS 510.

According to exemplary embodiments, when the determining module 418 determines that the incoming transaction request should be routed directly to the TPS 510, the receiving module 424 may be configured to receive the incoming transaction request; and the executing module 422 may be configured to execute the TPS's rule engine to select a corresponding PC 512 embedded within the TPS 510 based on the SATPG sever, wherein the corresponding PC 512 is configured to process the incoming transaction request.

According to exemplary embodiments, when the determining module 418 determines that the incoming transaction request should be routed to a corresponding sibling SATPG (i.e., SATPG 2 instead of SATPG 1; or SATPG 4 instead of SATPG3), the executing module 422 may be further configured to re-route the incoming transaction request to the corresponding sibling SATPG; and cause the corresponding sibling SATPG to repeat the functions of halting, determining, checking, and executing. In response, the receiving module 424 may be configured to receive the incoming transaction request; the determining module 418 may be configured to determine that the incoming transaction request should be routed directly to another TPS (i.e., TPS n instead of TPS 1). In response, the executing module 422 may be further configured to execute said another TPS's rule engine to select a corresponding PC (i.e., one of PC 1, PC 2, . . . PC n) embedded within said another TPS based on the sibling SATPG sever, wherein the corresponding PC is configured to process the incoming transaction request.

According to exemplary embodiments, when the APCR 504 loses a node, the SATPG 508 may recognize that the APCR node is down and determine whether any other APCR node are available as part of same group; automatically reconnect to said other available APCR node; and route, in response to automatically reconnecting, the incoming transaction request to the TPS.

According to exemplary embodiments, when the SATPG loses a node, the executing module 422 may cause nodes in the APCR 504 to be automatically reconnected to any other available SATPG nodes.

According to exemplary embodiments, the executing module 422 may be further configured to implement a preconfigured logic algorithm (i.e., as illustrated in FIG. 5) to establish a tight coupling between the SATPG 508 and the TPS 510, and wherein, when the TPS 510 loses a PC embedded within the TPS 510, SATPG nodes gets automatically routed to other available PC by the TPS 510 because of the tight coupling between the SATPG 508 and the TPS 510. For example, as illustrated in FIG. 5, if TPS1 losses PC1, SATPG nodes coming from SATPG 2 may be automatically routed to other available PCs, i.e., one of PC 2 . . . PC n.

Figure 6:
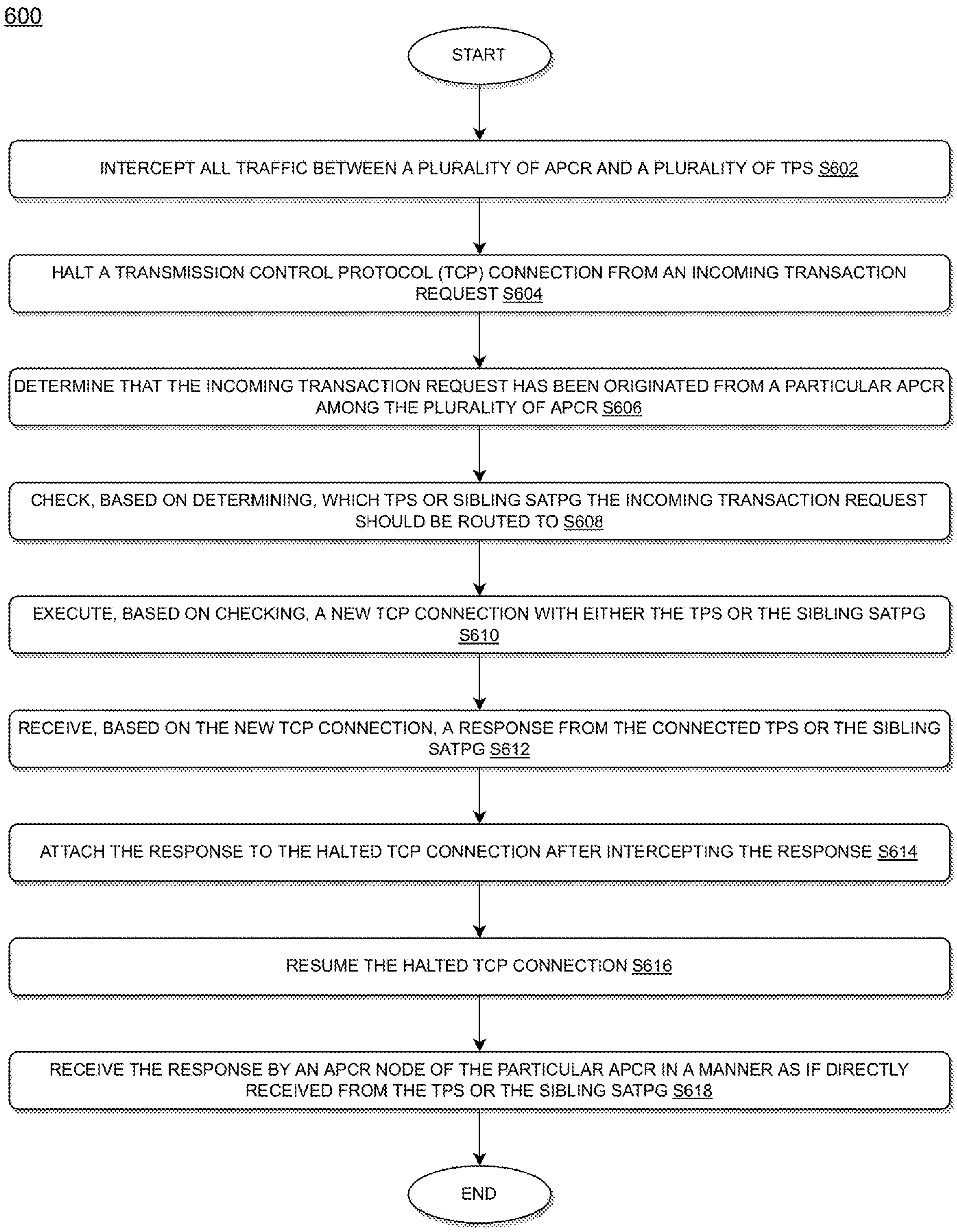
FIG. 6 illustrates an exemplary flow chart implemented by the platform, language, and cloud agnostic smart ATM transaction processing gateway module of FIG. 4 for implementing an SATPG configured to mediate traffic between an APCR and a TPS in accordance with an exemplary embodiment.

FIG. 6 illustrates an exemplary flow chart 600 implemented by the platform, language, and cloud agnostic SATPGM 406 of FIG. 4 for implementing an SATPG configured to mediate traffic between an APCR and a TPS in accordance with an exemplary embodiment. It may be appreciated that the illustrated process 600 and associated steps may be performed in a different order, with illustrated steps omitted, with additional steps added, or with a combination of reordered, combined, omitted, or additional steps.

As illustrated in FIG. 6, at step S602, the process 600 may include intercepting all traffic between a plurality of APCR and a plurality of TPS.

At step S604, the process 600 may include halting a TCP connection from an incoming transaction request.

At step S606, the process 600 may include determining that the incoming transaction request has been originated from a particular APCR among the plurality of APCR.

At step S608, the process 600 may include checking, based on determining, which TPS or sibling SATPG the incoming transaction request should be routed to.

At step S610, the process 600 may include executing, based on checking, a new TCP connection with either the TPS or the sibling SATPG.

At step S612, the process 600 may include receiving, based on the new TCP connection, a response from the connected TPS or the sibling SATPG.

At step S614, the process 600 may include attaching the response to the halted TCP connection after intercepting the response.

At step S616, the process 600 may include resuming the halted TCP connection.

At step S618, the process 600 may include receiving the response by an APCR node of the particular APCR in a manner as if directly received from the TPS or the sibling SATPG.

According to exemplary embodiments, in the process 600, the APCR may comprise a group of multiple ephemeral ATM platform servers in each region, and the TPS may comprise a group of servers which processes an ATM transaction, but the disclosure is not limited thereto.

According to exemplary embodiments, in the process 600, each TPS may include a plurality of PCs embedded therein, and wherein each PC may be configured to process a corresponding type of ATM transaction, but the disclosure is not limited thereto.

According to exemplary embodiments, the process 600 may further include implementing the SATPG in a manner such that it may comprise a group of servers responsible for mediating the traffic between the APCR and the TPS.

According to exemplary embodiments, in the process 600, the sibling SATPG may correspond to related SATPG servers in each region.

According to exemplary embodiments, when it is determined that the incoming transaction request should be routed directly to the TPS, the process 600 may further include: receiving the incoming transaction request; and executing the TPS's rule engine to select a corresponding PC embedded within the TPS based on the SATPG sever, wherein the corresponding PC is configured to process the incoming transaction request.

According to exemplary embodiments, when it is determined that the incoming transaction request should be routed to a corresponding sibling SATPG, the process 600 may further include: re-routing the incoming transaction request to the corresponding sibling SATPG; and repeating, by the corresponding sibling SATPG, the steps of halting, determining, checking, and executing; receiving the incoming transaction request; determining that the incoming transaction request should be routed directly to another TPS; and executing said another TPS's rule engine to select a corresponding PC embedded within said another TPS based on the sibling SATPG sever, wherein the corresponding PC is configured to process the incoming transaction request.

According to exemplary embodiments, when the APCR loses a node, the process 600 may further include: recognizing by the SATPG that the APCR node is down; determining, by the SATPG, whether any other APCR node is available as part of same group; automatically reconnecting to said other available APCR node; and routing, in response to automatically reconnecting, the incoming transaction request to the TPS.

According to exemplary embodiments, in the process 600, when the SATPG loses a node, nodes in the APCR gets automatically reconnected to any other available SATPG nodes.

According to exemplary embodiments, the process 600 may further include: implementing a preconfigured logic algorithm to establish a tight coupling between the SATPG and the TPS, and wherein, when the TPS loses a PC embedded within the TPS, SATPG nodes gets automatically routed to other available PC by the TPS because of the tight coupling between the SATPG and the TPS.

According to exemplary embodiments, the SATPGD 402 may include a memory (e.g., a memory 106 as illustrated in FIG. 1) which may be a non-transitory computer readable medium that may be configured to store instructions for implementing a platform, language, and cloud agnostic SATPGM 406 for implementing an SATPG configured to mediate traffic between an APCR and a TPS as disclosed herein. The SATPGD 402 may also include a medium reader (e.g., a medium reader 112 as illustrated in FIG. 1) which may be configured to read any one or more sets of instructions, e.g., software, from any of the memories described herein. The instructions, when executed by a processor embedded within the SATPGM 406 within the SATPGD 402, may be used to perform one or more of the methods and processes as described herein. In a particular embodiment, the instructions may reside completely, or at least partially, within the memory 106, the medium reader 112, and/or the processor 104 (see FIG. 1) during execution by the SATPGD 402.

According to exemplary embodiments, the instructions, when executed, may cause a processor embedded within the SATPGM 406 or the SATPGD 402 to perform the following: intercepting all traffic between a plurality of APCR and a plurality of TPS; halting a TCP connection from an incoming transaction request; determining that the incoming transaction request has been originated from a particular APCR among the plurality of APCR; checking, based on determining, which TPS or sibling SATPG the incoming transaction request should be routed to; executing, based on checking, a new TCP connection with either the TPS or the sibling SATPG; receiving, based on the new TCP connection, a response from the connected TPS or the sibling SATPG; attaching the response to the halted TCP connection after intercepting the response; resuming the halted TCP connection; and receiving the response by an APCR node of the particular APCR in a manner as if directly received from the TPS or the sibling SATPG. According to exemplary embodiments, the processor may be the same or similar to the processor 104 as illustrated in FIG. 1 or the processor embedded within SATPGD 202, SATPGD 302, SATPGD 402, and SATPGM 406.

According to exemplary embodiments, the instructions, when executed, may further cause the processor 104 to perform the following: implementing the SATPG in a manner such that it may comprise a group of servers responsible for mediating the traffic between the APCR and the TPS.

According to exemplary embodiments, when it is determined that the incoming transaction request should be routed directly to the TPS, the instructions, when executed, may further cause the processor 104 to perform the following: receiving the incoming transaction request; and executing the TPS's rule engine to select a corresponding PC embedded within the TPS based on the SATPG sever, wherein the corresponding PC is configured to process the incoming transaction request.

According to exemplary embodiments, when it is determined that the incoming transaction request should be routed to a corresponding sibling SATPG, the instructions, when executed, may further cause the processor 104 to perform the following: re-routing the incoming transaction request to the corresponding sibling SATPG; and repeating, by the corresponding sibling SATPG, the steps of halting, determining, checking, and executing; receiving the incoming transaction request; determining that the incoming transaction request should be routed directly to another TPS; and executing said another TPS's rule engine to select a corresponding PC embedded within said another TPS based on the sibling SATPG sever, wherein the corresponding PC is configured to process the incoming transaction request.

According to exemplary embodiments, when the APCR loses a node, the instructions, when executed, may further cause the processor 104 to perform the following: recognizing by the SATPG that the APCR node is down; determining, by the SATPG, whether any other APCR node is available as part of same group; automatically reconnecting to said other available APCR node; and routing, in response to automatically reconnecting, the incoming transaction request to the TPS.

According to exemplary embodiments, when the SATPG loses a node, the instructions, when executed, may further cause the processor 104 to perform the following: causing nodes in the APCR to be automatically reconnected to any other available SATPG nodes.

According to exemplary embodiments, the instructions, when executed, may further cause the processor 104 to perform the following: implementing a preconfigured logic algorithm to establish a tight coupling between the SATPG and the TPS, and wherein, when the TPS loses a PC embedded within the TPS, SATPG nodes gets automatically routed to other available PC by the TPS because of the tight coupling between the SATPG and the TPS.

According to exemplary embodiments as disclosed above in FIGS. 1-6, technical improvements effected by the instant disclosure may include a platform for implementing a platform, language, and cloud agnostic smart ATM transaction processing gateway module for implementing a platform and language agnostic smart ATM transaction processing gateway configured to mediate the traffic between an APCR and a TPS, break the tight coupling between APCR and TPS, while maintaining full resiliency and having an ability at points of the flow, and intelligently determine the routing of individual ATM transaction requests, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing a smart automated teller machine (ATM) transaction processing gateway (SATPG) configured to mediate traffic between an ATM platform cloud region (APCR) and a transaction processing system (TPS) by utilizing one or more processors along with allocated memory, the method comprising:

intercepting all traffic between a plurality of APCR and a plurality of TPS;

halting a transmission control protocol (TCP) connection from an incoming transaction request;

determining that the incoming transaction request has been originated from a particular APCR among the plurality of APCR;

checking, based on determining, which TPS or sibling SATPG the incoming transaction request should be routed to;

executing, based on checking, a new TCP connection with either the TPS or the sibling SATPG;

receiving, based on the new TCP connection, a response from the connected TPS or the sibling SATPG;

attaching the response to the halted TCP connection after intercepting the response;

resuming the halted TCP connection; and receiving the response by an APCR node of the particular APCR in a manner as if directly received from the TPS or the sibling SATPG.

2. The method according to claim 1, wherein the APCR is comprised of a group of multiple ephemeral ATM platform servers in each region, and wherein the TPS is comprised of a group of servers which processes an ATM transaction.

3. The method according to claim 2, wherein each TPS includes a plurality of processing centers (PCs) embedded therein, and wherein each PC is configured to process a corresponding type of ATM transaction.

4. The method according to claim 1, further comprising:

implementing the SATPG in a manner such that it comprises a group of servers responsible for mediating the traffic between the APCR and the TPS.

5. The method according to claim 4, wherein the sibling SATPG corresponds to related SATPG servers in each region.

6. The method according to claim 5, wherein, when it is determined that the incoming transaction request should be routed directly to the TPS, the method further comprising:

receiving the incoming transaction request; and executing the TPS's rule engine to select a corresponding processing center (PC) embedded within the TPS based on the SATPG sever, wherein the corresponding PC is configured to process the incoming transaction request.

7. The method according to claim 5, wherein, when it is determined that the incoming transaction request should be routed to a corresponding sibling SATPG, the method further comprising:

re-routing the incoming transaction request to the corresponding sibling SATPG; and repeating, by the corresponding sibling SATPG, the steps of halting, determining, checking, and executing;

receiving the incoming transaction request;

determining that the incoming transaction request should be routed directly to another TPS; and executing said another TPS's rule engine to select a corresponding processing center (PC) embedded within said another TPS based on the sibling SATPG sever, wherein the corresponding PC is configured to process the incoming transaction request.

8. The method according to claim 4, wherein, when the APCR loses a node, the method further comprising:

recognizing by the SATPG that the APCR node is down;

determining, by the SATPG, whether any other APCR node is available as part of same group;

automatically reconnecting to said other available APCR node; and routing, in response to automatically reconnecting, the incoming transaction request to the TPS.

9. The method according to claim 4, wherein, when the SATPG loses a node, nodes in the APCR gets automatically reconnected to any other available SATPG nodes.

10. The method according to claim 4, the method further comprising:

implementing a preconfigured logic algorithm to establish a tight coupling between the SATPG and the TPS, and wherein, when the TPS loses a processing center (PC) embedded within the TPS, SATPG nodes gets automatically routed to other available PC by the TPS because of the tight coupling between the SATPG and the TPS.

11. A system for implementing a smart automated teller machine (ATM) transaction processing gateway (SATPG) configured to mediate traffic between an ATM platform cloud region (APCR) and a transaction processing system (TPS), the system comprising:

a processor; and a memory operatively connected to the processor via a communication interface, the memory storing computer readable instructions, when executed, causes the processor to:

intercept all traffic between a plurality of APCR and a plurality of TPS;

halt a transmission control protocol (TCP) connection from an incoming transaction request;

determine that the incoming transaction request has been originated from a particular APCR among the plurality of APCR;

check, based on determining, which TPS or sibling SATPG the incoming transaction request should be routed to;

execute, based on checking, a new TCP connection with either the TPS or the sibling SATPG;

receive, based on the new TCP connection, a response from the connected TPS or the sibling SATPG;

attach the response to the halted TCP connection after intercepting the response;

resume the halted TCP connection; and receive the response by an APCR node of the particular APCR in a manner as if directly received from the TPS or the sibling SATPG.

12. The system according to claim 11, wherein the APCR is comprised of a group of multiple ephemeral ATM platform servers in each region, and wherein the TPS is comprised of a group of servers which processes an ATM transaction, and wherein each TPS includes a plurality of processing centers (PCs) embedded therein, and wherein each PC is configured to process a corresponding type of ATM transaction.

13. The system according to claim 11, the processor is further configured to:

implement the SATPG in a manner such that it comprises a group of servers responsible for mediating the traffic between the APCR and the TPS.

14. The system according to claim 13, wherein the sibling SATPG corresponds to related SATPG servers in each region.

15. The system according to claim 14, wherein, when it is determined that the incoming transaction request should be routed directly to the TPS, the processor is further configured to:

receive the incoming transaction request; and execute the TPS's rule engine to select a corresponding processing center (PC) embedded within the TPS based on the SATPG sever, wherein the corresponding PC is configured to process the incoming transaction request.

16. The system according to claim 14, wherein, when it is determined that the incoming transaction request should be routed to a corresponding sibling SATPG, the processor is further configured to:

re-route the incoming transaction request to the corresponding sibling SATPG; and cause the corresponding sibling SATPG to repeat the functions of halting, determining, checking, and executing;

receive the incoming transaction request;

determine that the incoming transaction request should be routed directly to another TPS; and execute said another TPS's rule engine to select a corresponding processing center (PC) embedded within said another TPS based on the sibling SATPG sever, wherein the corresponding PC is configured to process the incoming transaction request.

17. The system according to claim 13, wherein, when the APCR loses a node, the processor is further configured to:

recognize by the SATPG that the APCR node is down;

determine, by the SATPG, whether any other APCR node are available as part of same group;

automatically reconnect to said other available APCR node; and route, in response to automatically reconnecting, the incoming transaction request to the TPS.

18. The system according to claim 13, wherein, when the SATPG loses a node, the processor causes nodes in the APCR to be automatically reconnected to any other available SATPG nodes.

19. The system according to claim 13, the processor is further configured to:

implement a preconfigured logic algorithm to establish a tight coupling between the SATPG and the TPS, and wherein, when the TPS loses a processing center (PC) embedded within the TPS, SATPG nodes gets automatically routed to other available PC by the TPS because of the tight coupling between the SATPG and the TPS.

20. A non-transitory computer readable medium configured to store instructions for implementing a smart automated teller machine (ATM) transaction processing gateway (SATPG) configured to mediate traffic between an ATM platform cloud region (APCR) and a transaction processing system (TPS), the instructions, when executed, cause a processor to perform the following:

intercepting all traffic between a plurality of APCR and a plurality of TPS;

halting a transmission control protocol (TCP) connection from an incoming transaction request;

determining that the incoming transaction request has been originated from a particular APCR among the plurality of APCR;

checking, based on determining, which TPS or sibling SATPG the incoming transaction request should be routed to;

executing, based on checking, a new TCP connection with either the TPS or the sibling SATPG;

receiving, based on the new TCP connection, a response from the connected TPS or the sibling SATPG;

attaching the response to the halted TCP connection after intercepting the response;

resuming the halted TCP connection; and receiving the response by an APCR node of the particular APCR in a manner as if directly received from the TPS or the sibling SATPG.

* * * * *